(12) United States Patent
Elam (10) Patent No.: US 10,654,752 B2
(45) Date of Patent: *May 19, 2020

(54) ASPHALT CRACK FILLING SYSTEM AND METHOD OF USE

(71) Applicant: Matthew Paul Elam, Englewood, CO (US)

(72) Inventor: Matthew Paul Elam, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,313

(22) Filed: Jul. 1, 2019

(65) Prior Publication Data

US 2019/0322582 A1    Oct. 24, 2019

Related U.S. Application Data

(63) Continuation of application No. 16/154,464, filed on Oct. 8, 2018, which is a continuation of application No. 15/637,051, filed on Jun. 29, 2017, now Pat. No. 10,093,578.

(60) Provisional application No. 62/357,471, filed on Jul. 1, 2016.

(51) Int. Cl.
| | |
|---|---|
| *C04B 20/10* | (2006.01) |
| *E01C 23/06* | (2006.01) |
| *C04B 28/02* | (2006.01) |
| *E01C 23/09* | (2006.01) |
| *C04B 111/00* | (2006.01) |
| *C04B 111/72* | (2006.01) |

(52) U.S. Cl.
CPC ...... *C04B 20/1051* (2013.01); *C04B 20/1044* (2013.01); *C04B 28/02* (2013.01); *E01C 23/06* (2013.01); *E01C 23/0973* (2013.01); *C04B 2111/0075* (2013.01); *C04B 2111/72* (2013.01)

(58) Field of Classification Search
CPC .......... E01C 23/06; E01C 23/00; E01C 23/02; E01C 23/10; E01C 23/07; E01C 23/14; E01C 11/005; E01C 19/45; C04B 20/1044; C04B 20/1051
See application file for complete search history.

(56) References Cited

U.S. PATENT DOCUMENTS

| | | | | |
|---|---|---|---|---|
| 2,570,185 A | * | 10/1951 | Aldrich ..................... | C08K 5/17 106/269 |
| 2,937,580 A | * | 5/1960 | Spalding .......................... | 404/14 |
| 5,006,012 A | * | 4/1991 | Sterner .................... | E01C 19/21 404/107 |
| 5,232,306 A | * | 8/1993 | Sterner .................... | E01C 23/06 404/107 |
| 5,405,213 A | * | 4/1995 | O'Connor ............... | E01C 7/187 404/107 |

(Continued)

OTHER PUBLICATIONS

U.S. Appl. No. 16/059,990, filed Aug. 9, 2018, Elam.

(Continued)

*Primary Examiner* — Abigail A Risic
(74) *Attorney, Agent, or Firm* — Sheridan Ross P.C.

(57) ABSTRACT

Enhanced crack filler materials, systems, and methods for filling and repairing cracks in asphalt surfaces, such as asphalt roadways. The enhanced crack filler material includes crack filler and a silane additive. The silane additive includes organosilane, benzyl alcohol, and ethylene glycol. The crack filler, when combined with the silane additive, provides an enhanced crack filling material having a lower viscosity and a greater ability to penetrate cracks when compared to conventional crack filler materials.

20 Claims, 5 Drawing Sheets

(56) References Cited

U.S. PATENT DOCUMENTS

| | | | | |
|---|---|---|---|---|
| 5,567,764 A * | 10/1996 | Brasseur | C09D 183/04 | 524/755 |
| 5,584,597 A * | 12/1996 | Lemelson | E01C 23/06 | 299/41.1 |
| 6,074,128 A * | 6/2000 | Marino | C08L 95/005 | 404/75 |
| 6,619,882 B2 * | 9/2003 | Harvey | E01C 23/098 | 404/107 |
| 7,704,561 B2 | 4/2010 | Mehta et al. | | |
| 7,815,725 B2 | 10/2010 | Reinke et al. | | |
| 7,968,627 B2 | 6/2011 | Reinke et al. | | |
| 7,981,466 B2 | 7/2011 | Reinke et al. | | |
| 8,679,245 B2 | 3/2014 | Reinke et al. | | |
| 8,734,581 B2 | 5/2014 | Reinke et al. | | |
| 9,175,446 B2 | 11/2015 | Reinke et al. | | |
| 9,394,652 B2 | 7/2016 | Reinke et al. | | |
| 9,739,021 B1 * | 8/2017 | Kuhn | E01C 23/0973 | |
| 2004/0116557 A1 * | 6/2004 | Pounds | C04B 26/045 | 524/59 |
| 2010/0222449 A1 * | 9/2010 | Noda | C08K 5/0025 | 522/99 |
| 2013/0276668 A1 * | 10/2013 | Ranka | C08L 95/005 | 106/122 |
| 2016/0130474 A1 * | 5/2016 | Dongre | C09D 195/005 | 428/407 |
| 2016/0376440 A1 * | 12/2016 | Naidoo | C08L 95/00 | 106/122 |
| 2017/0298579 A1 * | 10/2017 | Kuhn | E01C 23/0973 | |

OTHER PUBLICATIONS

Official Action for U.S. Appl. No. 15/637,051, dated Feb. 13, 2018, 13 pages.

Notice of Allowance for U.S. Appl. No. 15/637,051, dated Jun. 4, 2018, 7 pages.

Official Action for U.S. Appl. No. 16/154,464, dated Nov. 8, 2018, 15 pages.

Notice of Allowance for U.S. Appl. No. 16/154,464, dated Mar. 21, 2019, 7 pages.

* cited by examiner

ASPHALT CRACK FILLING SYSTEM AND METHOD OF USE

CROSS REFERENCE TO RELATED APPLICATIONS

The present application is a continuation of U.S. patent application Ser. No. 16/154,464, filed Oct. 8, 2018, which is a continuation of U.S. patent application Ser. No. 15/637,051, filed Jun. 29, 2017, now U.S. Pat. No. 10,093,578, which issued on Oct. 9, 2018, which claims the benefit of and priority, under 35 U.S.C. § 119(e), to U.S. Provisional Application Ser. No. 62/357,471, filed Jul. 1, 2016, all of which are entitled "ASPHALT CRACK FILLING SYSTEM AND METHOD OF USE," the entire disclosure of which is hereby incorporated herein by reference, in its entirety, for all that it teaches and for all purposes.

FIELD

The present disclosure is generally directed to roadway maintenance and repair, and, in particular, to a system and method for filling and repairing cracks in asphalt surfaces such as asphalt roadways.

BACKGROUND

Asphalt crack filling is a labor intensive, costly, and challenging activity. Conventional approaches to asphalt crack filling are time consuming, unpredictable, and generally yield repairs that are sensitive to failure. Most asphalt crack filling approaches provide an incomplete crack fill, providing a number of voids, exclusions, and/or unfilled spaces making the crack susceptible to decay or deterioration from moisture or sinking. Typical asphalt repairs also have highly variable adhesion characteristics and require, for best performance, application at temperatures at or above 400 degrees Fahrenheit (F). Also, many asphalt (crack filling and/or repair) mixes, especially polymerized mixes, are difficult to work with (e.g., difficult to rake, shovel, clean, etc.) and are hard to compact with rollers to an optimal density.

As can be appreciated, traditional asphalt crack filling mixes suffer from low crack repair strength, unyielding adhesive properties which are difficult to clean or remove from tools and equipment, unpredictable fill characteristics, and in some cases unworkable material characteristics. In addition, conventional asphalt crack filing methods require high operating temperatures (e.g., to bring the asphalt crack filling mixes into a workable state), labor intensive filling and application operations, complex cleaning operations after application, high operating costs associated with heating and applying the mix material into cracks, and the costs associated with replacing tools that cannot be sufficiently cleaned, etc.

DETAILED DESCRIPTION

It is with respect to the above issues and other problems that the embodiments presented herein were contemplated. In general, embodiments of the present disclosure provide methods, devices, compounds, and systems that increase crack repair strength, provide more durable crack filler, increase predictability and/or robustness of crack repairs, provide a filler that is easy to work into cracks, and, in some embodiments, a crack filler that may be used at temperatures below 400 degrees F. In some embodiments, the systems and/or methods comprise combining a silane additive (e.g., an organosilane, etc.) to crack filler materials providing an enhanced crack filling material and an improved crack filling process.

Figure 1A:
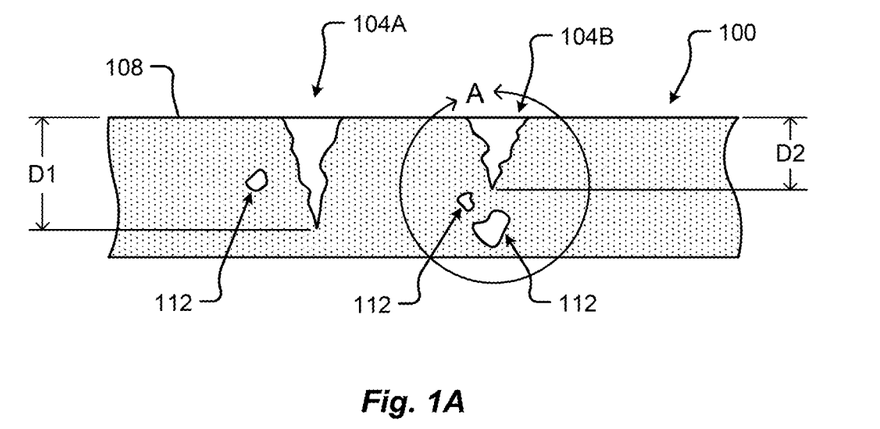
FIG. 1A is a cross-sectional view of a damaged portion of asphalt having a number of cracks in accordance with embodiments of the present disclosure.

Referring to FIG. 1A, a cross-sectional view of a damaged portion of asphalt 100 having a number of cracks 104A, 104B and exclusions, or voids 112, disposed therein is shown in accordance with embodiments of the present disclosure. In some embodiments, the cracks 104A, 104B and/or voids 112 formed in the asphalt 100 may be a result of poor drainage, an unbalanced asphalt cement to aggregate mix, weak base or subgrade, soil shrinkage and/or expansion, temperature cycling, overloading, impact, and/or some other distressing or damaging condition. In any event, the cracks 104A, 104B may be configured as an opening in the asphalt 100 that extends from an upper surface 108 of the asphalt 100 to a certain depth (e.g., D1, D2, etc.) in the asphalt 100. Some cracks 104A, 104B in asphalt 100 may taper from a first width dimension at the upper surface 108 of the asphalt 100 to a narrower second width dimension disposed at the depth D2, D2 inside, or through, the asphalt 100.

Figure 1B:
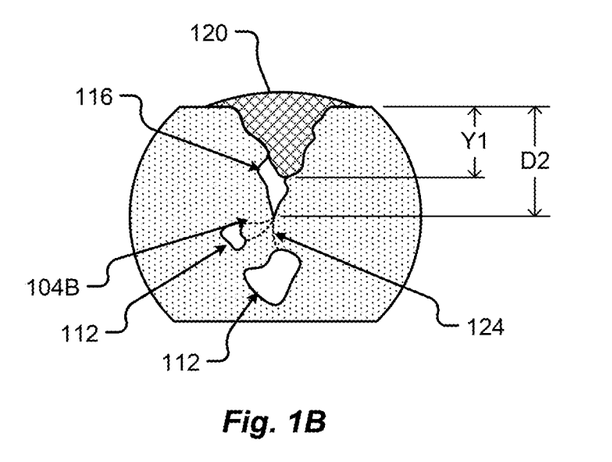
FIG. 1B is a detail section view taken from circle "A" of FIG. 1A of a crack filled with a conventional crack filler.

FIG. 1B shows a detail section view taken from circle "A" of FIG. 1A of a crack 104B filled with a conventional crack filler 120. As described above, conventional crack filler 120 requires heating to temperatures greater than 400 degrees F. to decrease the viscosity of the conventional crack filler 120 and allow the material to flow into a crack 104B. However, and as shown in FIG. 1B, the conventional crack filler 120 typically cools quickly and may not flow throughout a complete volume of the crack 104B. In other words, the conventional crack filler 120 may become cooled at a premature curing depth Y1, leaving an unfilled volume 116 inside the crack 104B. The unfilled volume 116 may extend from the premature curing depth Y1 to the depth D2 of the crack 104B.

Among other things, this unfilled volume 116 may provide an unwanted recess where fluid (e.g., water, oil, etc.) or some other substance can collect. Over time, the fluid may cause the crack 104B to fracture along one or more fracture lines 124 to at least one other crack or void 112. For example, water may seep into the unfilled volume 116 due to porosity or shrinkage of the conventional crack filler 120. Continuing this example, as temperature surrounding the crack 104B drops below the freezing point of the water contained in the unfilled volume 116, the water may solidify into ice exerting a pressure inside the unfilled volume 116 of the crack 104B. As the pressure increases, the crack 104B may propagate (e.g., along one or more fracture lines 124) to an adjacent crack and/or void 112, compromising the integrity of the crack fill, or repair.

Figure 1C:
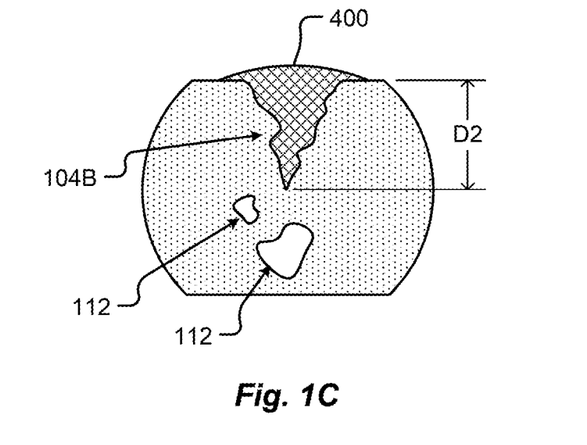
FIG. 1C is a detail section view taken from circle "A" of FIG. 1A of a crack filled with an enhanced crack filler in accordance with embodiments of the present disclosure.

FIG. 1C is a detail section view taken from circle "A" of FIG. 1A of a crack 104B filled with an enhanced crack filler 400 in accordance with embodiments of the present disclosure. As shown in FIG. 1C, the enhanced crack filler 400 substantially fills an entirety of the crack 104B. In one embodiment, the enhanced crack filler 400 may fill the crack 104B an entire depth D2 of the crack 104B. In some embodiments, the enhanced crack filler 400, as described herein, may comprise a modified compound configured to allow the enhanced crack filler 400 to flow at lower temperature ranges than the conventional crack filler 120, such that the enhanced crack filler 400 does not harden before reaching the depth D2 of the crack 104B.

Figure 2:
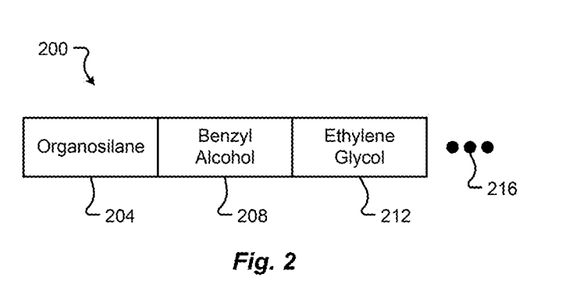
FIG. 2 is a block diagram of a silane additive compound in accordance with embodiments of the present disclosure.

FIG. 2 is a block diagram of a silane additive 200 in accordance with embodiments of the present disclosure. It is an aspect of the present disclosure that the enhanced crack filler 400 comprises the silane additive 200 mixed with crack filler material 300 (described in conjunction with FIG. 3). The silane additive 200 may comprise one or more of an organosilane 204, a benzyl alcohol 208, an ethylene glycol 212, and/or some other compound, solvent, or additive 216. In one embodiment, the silane additive 200 may comprise organosilane 204 combined with benzyl alcohol 208. In some embodiments, the silane additive 200 may comprise organosilane 204 combined with benzyl alcohol 208 and ethylene glycol 212. In one embodiment, the silane additive 200 may comprise the chemical bonding additive including organosilane 204 combined with benzyl alcohol 208 and ethylene glycol 212 manufactured by Zydex® Industries under the trade name ZycoTherm™.

Figure 3:
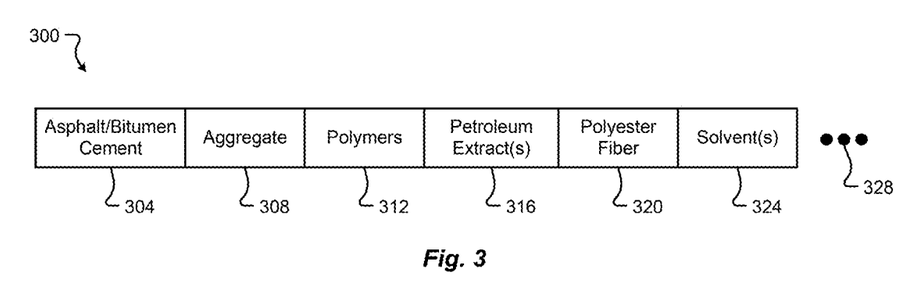
FIG. 3 is a block diagram of a crack filler compound in accordance with embodiments of the present disclosure.

FIG. 3 is a block diagram of a crack filler 300 compound in accordance with embodiments of the present disclosure. The crack filler 300 compound may comprise one or more of asphalt/bitumen cement 304, aggregate 308, polymers 312, petroleum extracts 316, polyester fiber 320, solvents 324, and/or more 328. In some embodiments, the crack filler 300 may comprise one or more conventional sealants manufactured by Crafco® Inc. (e.g., Deery Brand®) under the trade name DEERY 974, by Maxwell Products, Inc. under the trade name Elastoflex™, etc., and/or by some other manufacturer.

Figure 4:
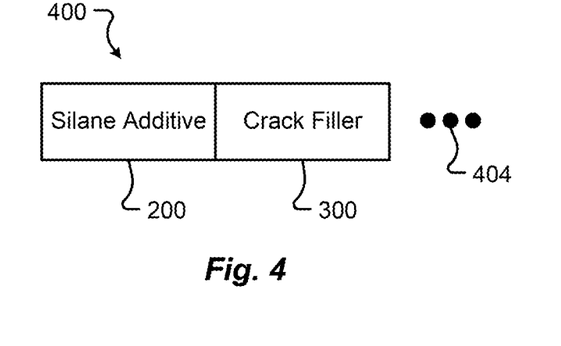
FIG. 4 is a block diagram of an enhanced crack filler compound in accordance with embodiments of the present disclosure.

FIG. 4 is a block diagram of an enhanced crack filler 400 compound in accordance with embodiments of the present disclosure. The enhanced crack filler 400 may comprise a silane additive 200 (e.g., as described in conjunction with FIG. 2) combined with a crack filler 300 (e.g., as described in conjunction with FIG. 3) and/or one or more other additives 404. In some embodiments, the enhanced crack filler 400 may be made in accordance with the method of manufacturing described in conjunction with FIG. 5.

Figure 5:
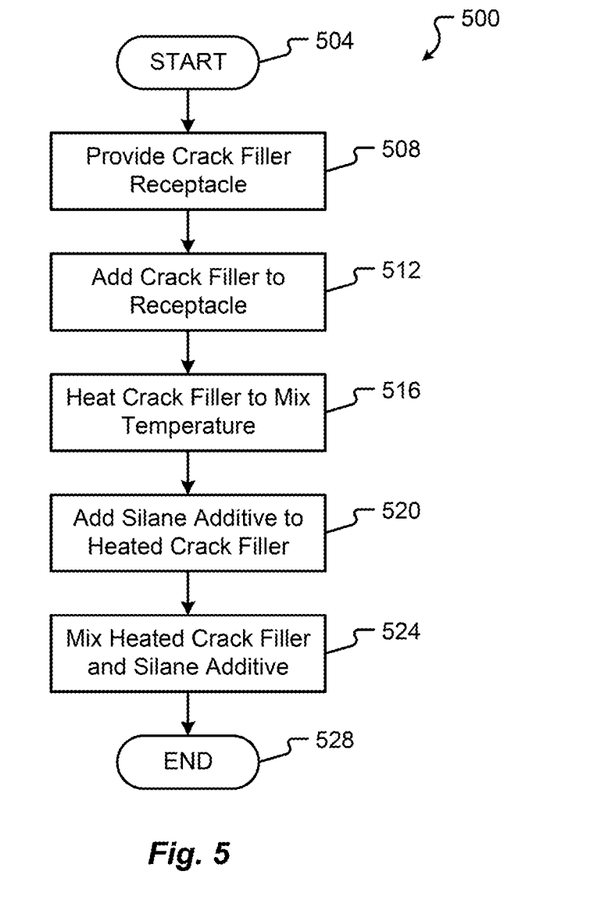
FIG. 5 is a flow diagram of a method for manufacturing an enhanced crack filler compound in accordance with embodiments of the present disclosure.
Figure 6:
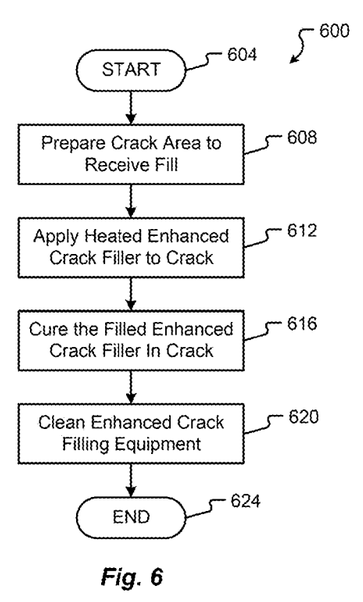
FIG. 6 is a flow diagram of a method of filling cracks using an enhanced crack filler compound in accordance with embodiments of the present disclosure.
Figure 7:
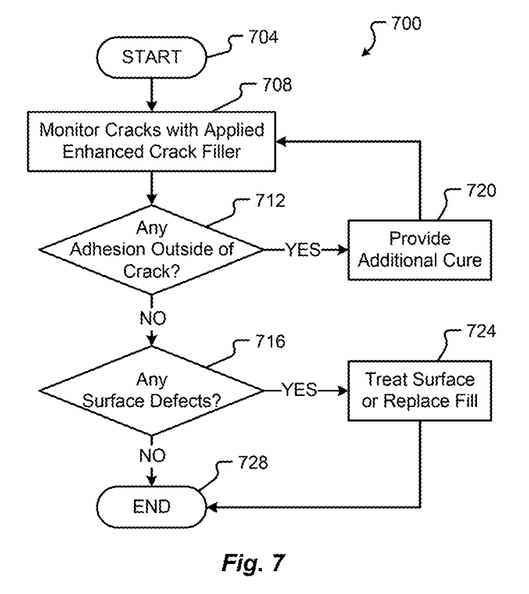
FIG. 7 is a flow diagram of a method of determining cure characteristics of applied enhanced crack filler in accordance with embodiments of the present disclosure.

In some embodiments, the methods 500, 600, 700 described in conjunction with FIGS. 5, 6, and 7 may comprise a crack filling operation using the enhanced crack filler 400. For instance, the crack filling operations may begin by preparing and/or manufacturing the enhanced crack filler 400 (e.g., as described in conjunction with FIG. 5, etc.), applying the enhanced crack filler 400 and cleaning the tools associated with applying the enhanced crack filler 400 (e.g., as described in conjunction with FIG. 6), and monitoring the enhanced crack filler 400 applied to a crack (e.g., as described in conjunction with FIG. 7).

FIG. 5 is a flow diagram of a method 500 for manufacturing an enhanced crack filler 400 compound in accordance with embodiments of the present disclosure. The method 500 begins at step 504 and may proceed by providing a crack filler receptacle (step 508). The crack filler receptacle may be a mixing container, drum, pour pot, cart, and/or some other system configured to hold, heat, and/or mix the substances (e.g., the silane additive 200 and the crack filler 300, etc.) making up the enhanced crack filler 400. In one embodiment, the crack filling receptacle may be similar, if not identical, to the crack filler receptacle 804 described in conjunction with FIG. 8.

Next, the method 500 may continue by adding crack filler 300 to the crack filler receptacle (step 512). In one embodiment, the crack filler 300 may be added in the form of solid, or semi-solid, material such as blocks, strips, or chips. In some embodiments, the crack filler 300 may be automatically added to the crack filler receptacle via a dispensing element associated with an automated enhanced crack filling system (see, e.g., FIG. 8). In any event, a defined amount (e.g., defined by weight, etc.) of crack filler 300 (e.g., commercially-available, etc.) is provided. The crack filler 300 may be provided in a standard 50-pound block. The crack filler receptacle may be sized to receive the defined amount of crack filler 300.

The method 500 proceeds by heating the crack filler 300 up to a mix temperature (step 516). In one embodiment, the crack filler 300 may be heated as described below. In another embodiment, the crack filler 300 may not be heated until additional materials are added, for example, the silane additive 200 (step 520). In any event, the crack filler 300 and/or silane additive 200 may be heated to a target temperature value or range. The heating of the materials may be provided by one or more heating elements associated with the crack filler receptacle. In some embodiments, the temperature of the mix may be observed via one or more temperature sensors, thermocouples, etc. The temperature may be maintained by a controller monitoring sensed temperature data inside the crack filler receptacle and/or heated materials and controlling the one or more heating elements associated with the crack filler receptacle.

In one embodiment, the temperature may be raised and maintained between 350 degrees F. and 430 degrees F. In another embodiment, the temperature may be raised and maintained between 370 degrees F. and 410 degrees F. In yet another embodiment, the temperature may be raised and maintained between 380 degrees F. and 400 degrees F.

It is an aspect of the present disclosure that the temperature of the crack filler 300 and/or silane additive 200 may be raised and maintained below 400 degrees F. In some embodiments, the temperature may be raised and maintained between 320 degrees F. and 360 degrees F. In another embodiment, the temperature may be raised and maintained between 340 degrees F. and 360 degrees F. In yet another embodiment, the temperature may be raised and maintained at approximately 350 degrees F.

Next, the method 500 may proceed by mixing the crack filler 300 and the silane additive 200 (e.g., organosilane, benzyl alcohol, and ethylene glycol, etc.) inside the crack filler receptacle for a determined time period (step 524). The temperature of the mixed crack filler 300 and silane additive may be maintained at one or more of the temperatures and/or temperature ranges described above. In one embodiment, the determined time period for mixing may be between 0.5 and 3.0 hours. In another embodiment, the above substances may be mixed for between 0.75 and 2.5 hours. In yet another embodiment, the above substances may be mixed for between 1.0 and 2.0 hours. The mixed substances form the enhanced crack filler 400.

In some embodiments, the organosilane in the silane additive 200 may be the active ingredient while the other substances (e.g., benzyl alcohol and/or ethylene glycol, etc.) may be solvents designed to make the enhanced crack filler 400 a liquid, or pourable compound, and therefore disbursable into the crack filler 300.

The mixing percentages of the silane additive 200, in some embodiments, may be as provided in Table 1 below.

TABLE 1

Mixture Percentages

| Organosilane | Benzyl Alcohol | Ethylene Glycol |
| --- | --- | --- |
| 23%-27% | 72%-74% | 1%-2% |
| 23%-27% | 75% | 4% |
| 25%-27% | 72%-74% | 1%-2% |
| 33% | 67% | 0% |
| 67% | 33% | 0% |
| 65%-70% | 25%-27% | 3%-5% |

In one embodiment, the silane additive 200 added to the crack filler 300 may be Zycotherm™, added as approximately 0.1% by weight relative to the crack filler 300. For example, if a single 50-pound block of crack filler 300 is used, then 0.1% by weight or 0.05-pounds of Zycotherm™ would be added. In another embodiment, 0.1% of Zycotherm™ may be added for a 500-pound amount of crack filler 300, for a total of approximately 0.5-pound of Zycotherm™. In any event, the method 500 of manufacturing an enhanced crack filler 400 ends at step 528.

FIG. 6 is a flow diagram of a method 600 of repairing asphalt or filling cracks using an enhanced crack filler 400 compound in accordance with embodiments of the present disclosure. The method 600 begins at step 604 and proceeds by preparing a crack area to receive the enhanced crack filler 400 (step 608). In some embodiments, preparing the crack area may include identifying at least one crack targeted for repair. The targeted crack may then be cleaned of debris and/or excess dirt. This step may include vacuuming debris and/or detritus from the crack, forcing dry air into the crack ejecting debris and/or detritus, etc., sweeping an area around the crack, etc., and/or combinations thereof. In some embodiments, a cleaning agent may be added to the crack to prepare the crack for repair.

Next, the method 600 continues by applying the enhanced crack filler 400 to the crack (step 612). In one embodiment, this step may include filling the crack with the heated enhanced crack filler 400 formed as described above and in conjunction with FIGS. 4 and 5. The crack may be filled by any means known to those skilled in the art, including, but in no way limited to, inserting enhanced crack filler 400 into the crack via an applicator, a volumetric dispenser, a metered dispenser, a wand, a pouring via a pour pot, etc.

Once the crack is filled with the enhanced crack filler 400, the enhanced crack filler 400 may be cured (step 616). The enhanced crack filler 400 may be configured to time cure, temperature cure, and/or pressure cure. In some embodiments, the enhanced crack filler 400 may only require a cooling time to harden, or solidify, and cure. The enhanced crack filler 400 may cure at temperatures under 250 degrees F. For instance, the enhanced crack filler 400 may cure at temperatures between 150 to 250 degrees F.

In some embodiments, the method 600 may continue by cleaning the equipment used in the manufacture and/or application of the enhanced crack filler 400 (step 620). For example, cleaning the equipment may include removing the enhanced crack filler 400 from one or more of the crack filler receptacle, mixing tool, shovel, rake, wand, applicator, etc., and/or the like. In some embodiments, the enhanced crack filler 400 (e.g., including the silane additive 200, etc.) may comprise surfactants having wetting characteristics configured to provide a simple cleanup of objects in contact with the enhanced crack filler 400. In one embodiment, tools having semi-cured or cured enhanced crack filler 400 deposited thereon may be inserted into remaining heated enhanced crack filler 400 inside the crack filler receptacle. Upon being reheated, the enhanced crack filler 400 on the tools may lose adhesion between a surface of the tools and the reheated enhanced crack filler 400. In one embodiment, the silane additive 200 of the enhanced crack filler 400 may include surfactants that provide a lower surface tension in the materials making up the enhanced crack filler 400, compared to that of conventional crack filler not including the silane additive 200. This reduced surface tension provides lower adhesive properties of the enhanced crack filler 400 at certain temperatures (e.g., in the range of 300 degrees F. to 400 degrees F., etc.). As can be appreciated, the inclusion of the silane additive 200 may allow for easy cleanup of tools and equipment used in crack filling operations. The method 600 may end at step 624.

FIG. 7 is a flow diagram of a method 700 of determining cure characteristics of applied enhanced crack filler 400 in accordance with embodiments of the present disclosure. For instance, after the completion of step 612 and/or step 616, the filled crack may be monitored (step 708). In some embodiments, the method 700 may proceed by determining whether any adhesion is occurred outside of the crack volume (step 712). By way of example, the filled crack may be monitored, or observed, to identify if any of the enhanced crack filler 400 inside the filled crack adheres to another contacting surface (e.g., whether tires traveling over the filled crack or shoes walking over the filled crack pull up any of the enhanced crack filler 400, etc.). In the event that this type of unwanted adhesion is observed, the material making up the enhanced crack filler 400 may not be fully cured. As such, the method 700 may proceed by providing an additional cure to the enhanced crack filler 400 (step 720). In one embodiment, the additional cure may include allowing more time for the enhanced crack filler 400 inside the crack to harden and/or solidify. In some embodiments, the additional cure may include adding a chemical or additive to the enhanced crack filler 400 inside the crack to harden or cure the material making up the enhanced crack filler 400. In any event, once the additional cure is provided, the method 700 may return to step 708 where the enhanced crack filler 400 is monitored.

In the event that no adhesion of the enhanced crack filler 400 is observed outside of the crack, the method 700 may proceed by determining whether any surface defects are present in the enhanced crack filler 400 (step 716). By way of example, the filled crack may be observed to identify whether any unusual effects (e.g., pitting, inverted crowning, sinking, etc.) appear on a surface of the enhanced crack filler 400. In some embodiments, the filled crack may require additional time to cure when surface defects are present. In one embodiment, the filled crack may have cured too quickly when surface defects are present on the surface of the enhanced crack filler 400 inside the crack. In some cases, the filled crack may be allowed more time to cure. In one embodiment, the surface of exposed enhanced crack filler 400 may be treated to remove the defects and/or further cure the exposed material. In some embodiments, for example, where the surface defects are unrepairable, the fill may need to be replaced (e.g., by repeating the steps described in conjunction with FIG. 6, etc.)

In any event, the crack curing time may be a function of several factors including, but in no way limited to, the depth of the crack, width of the crack, length of crack, humidity around the crack, temperature of the air around the crack, etc., and/or combinations thereof. Typically, the crack may be cured enough (e.g., sufficiently hardened and/or solidified, etc.) to allow traffic flow over the crack at 2-6 hours from crack filling with the enhanced crack filler 400.

Figure 8:
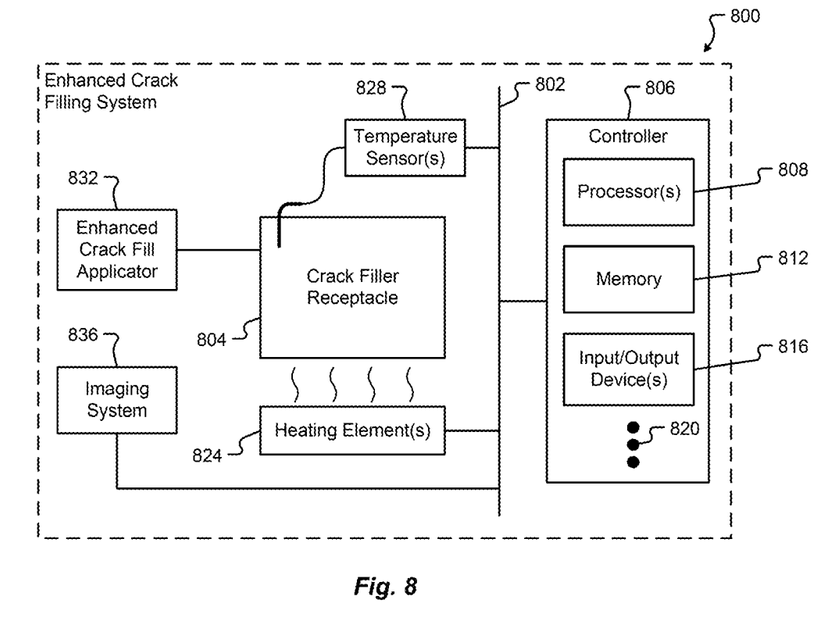
FIG. 8 is a block diagram of an enhanced crack filling system in accordance with embodiments of the present disclosure.

FIG. 8 is a block diagram of an enhanced crack filling system 800 in accordance with embodiments of the present disclosure. The enhanced crack filling system 800 may correspond to an enhanced crack filling machine configured to make (e.g., manufacture), apply, monitor, and/or clean the enhanced crack filler 400 as described above. The enhanced crack filling system 800 is shown comprising hardware elements that may be electrically coupled via a bus 802. The hardware elements may include a controller 806 having one or more processors 808, a memory 812, one or more input/output devices 816, and/or other controller elements 820. In some embodiments, the hardware elements may include a crack filler receptacle 804, one or more heating elements 824, at least one temperature sensor 828, an enhanced crack fill applicator 832, and/or an imaging system 836.

The controller 806 may correspond to a programmable logic controller (PLC), a proportional integral derivative (PID) controller, a computer system, and/or the like. The controller 806 may comprise a general purpose programmable processor or controller for executing application programming or instructions related to the enhanced crack filling system 800. Furthermore, the controller 806 can perform operations for configuring and transmitting/receiving information as described herein. The controller 806 may include multiple processor cores, and/or implement multiple virtual processors. Optionally, the controller 806 may include multiple physical processors. By way of example, the controller 806 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

In some embodiments, the controller 806 may be configured to one or more of operate the crack filler receptacle at a specific temperatures, control the temperatures (e.g., via controlling the one or more heating elements 824, etc.), automatically apply the enhanced crack filler 400 via an interconnected enhanced crack fill applicator 832, monitor an output from the applicator 832 (e.g., via the imaging system 836, etc.), and/or other functions described in conjunction with FIGS. 5-7 above.

Examples of the processors 808 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The memory 812 may correspond to a data storage medium (e.g., a computer-readable storage medium, etc.) that stores instructions used by the processor 808 for processing information provided by the sensors 828, elements 824, and systems 836 of the enhanced crack filling system 800. In some embodiments, the memory 812 may be a disk drive, optical storage device, solid-state storage device such as a random access memory ("RAM") and/or a read-only memory ("ROM"), which can be programmable, flash-updateable, and/or the like.

The input/output devices 816 may correspond to one or more ports through which the controller can send and receive data. For instance, the controller 806 may be configured to send control instructions via the input/output devices 816. Additionally or alternatively, the controller 806 may receive information (e.g., temperature detected by the temperature sensors 828, imaging data detected by the imaging system 836, etc.) from the various elements and/or systems making up the enhanced crack filling system 800.

The heating elements 824 may include one or more induction heaters, coil heaters, heating rods, burners, flames, infrared heaters, etc., and/or some other heating system operatively associated with the crack filler receptacle 804. The crack filler receptacle 804 may be configured as a drum, pot, bucket, or other container that is configured to hold crack filler material (e.g., enhanced crack filler 400, etc.). The heating elements 824 may be disposed in, around, outside, and/or adjacent to the crack filler receptacle 804 in an arrangement to heat contents inside the crack filler receptacle 804.

The temperature sensors 828 may include one or more contact (e.g., thermocouples, etc.) or contactless elements (e.g., infrared imaging sensors, etc.) configured to measure a temperature of a material inside the crack filler receptacle 804. In some embodiments, the temperature sensors 828 may provide temperatures detected to the controller 806, and in response, the controller 806 may determine whether to control the one or more heating elements 824 to adjust a temperature of the material inside the crack filler receptacle 804, forming a feedback loop. The material inside the crack filler receptacle 804 may be maintained at one or more of the temperatures and/or temperature ranges as described herein.

The enhanced crack fill applicator 832 may correspond to a wand, dispensing head, gated spout, valve, and/or other automatically movable element configured to dispense the enhanced crack filler 400 from the crack filler receptacle 804. In some embodiments, the enhanced crack fill applicator 832 may be manually actuated to dispense the enhanced crack filler 400 from the crack filler receptacle 804. In any event, the enhanced crack fill applicator 832 may be operatively connected to the crack filler receptacle 804 via one or more fluid lines.

The imaging system 836 may include one or more components configured to detect image information associated with enhanced crack filler 400 dispensed from the crack filler receptacle 804 via the applicator 832. In some embodiments, the imaging system 836 may include a lens, filter, image sensor, and/or a digital image processer. It is an aspect of the present disclosure that the imaging system 836 may monitor the dispensed enhanced crack filler 400 as described in conjunction with FIG. 7 above.

It should be noted that conventional crack filling methods typically require a temperature at or above 400 degrees F. prior to filling a crack. In contrast, the compounds, methods, and/or systems of the present disclosure may be applied at a temperature below 400 degrees F. For example, the enhanced crack filler 400 described above may be applied at a temperature between 320 degrees F. and 360 degrees F.

Among other things, the benefits of the disclosed compounds, methods, and systems include reduced application time (e.g., a reduction in application time by about 50%) and more effective chemical bonding. The disclosed compounds, methods, and systems are easier to compact and work (e.g., to rake or shovel) than conventional crack filler, and may even be more durable. Here, "more durable" may includes more moisture resistant and less likely to allow the asphalt binder to "strip" or de-bond from the aggregate than conventional crack filler.

In one embodiment, the above-disclosed enhanced crack filler 400 and methods may be employed to reduce the amount of latex polymer used in AC-latex polymer crack filler materials. For example, a crack filler composed of 60% asphalt cement (AC) and 40% latex polymer may only be required to use 20% polymer when employed with the above-disclosed enhanced crack filler 400 and methods.

In one embodiment, and as further tested, 0.1% of Zyco-ThermEZ™ was added to 500-pounds of crack filler (e.g., to form the enhanced crack filler 400) and compared against the same amount of crack filler without ZycoThermEZ™ (e.g., conventional crack filler). The enhanced crack filler 400 was found to be smoother than and went down nearly twice as fast as conventional crack filler. When the enhanced crack filler 400 cooled off from 400 degrees F., which is the normal application temp, to around the 360 degrees F. the material still flowed into the crack with no hardening or reduced flow issues. Normally, at 360 degrees F. the conventional crack filler will have trouble flowing and be very hard to work with. In contrast, the crack filler including the silane additive 200 (e.g., forming the enhanced crack filler 400) flows with lower viscosity and greater penetration, and as such, is easier to work with than conventional crack filler, especially at lower temps. Besides the ease of use the silane additive 200 in the enhanced crack filler 400 provides additional benefits such as moisture resistance, chemical bonding (anti-stripping), and quick equipment cleaning.

In addition, conventional crack filler cannot adequately penetrate deeply into a crack before it cools and hardens (e.g., at temperatures under 400 degrees F., etc.). In other words, the material making up the conventional crack filler hardens to the point it stops flowing before it hits the bottom of the crack. The enhanced crack filler 400 disclosed herein penetrates cracks deeper than the conventional crack filler and flows to the depths of a crack as it does not cool and harden at the same elevated temperatures as the conventional crack filler. As can be appreciated, the enhanced crack filler 400 offers a great benefit over the conventional crack filler as the conventional crack filler can allow more moisture damage to the bottom of the pavement that is prevented by the enhanced crack filler 400 reaching the bottom of a crack. In addition, the organosilane in the enhanced crack filler 400 silane additive 200 provides chemical bonding when the organosilane contacts any material, especially uncontrolled material in a crack, or material of a salacious nature. This may include, but is in no way limited to, dust, sand, dirt/base and the bottom of the crack, exposed aggregate in the old asphalt after routing/sawing the crack, etc. As can be appreciated, the enhanced crack filler 400 offers a layer of bonding that would not exist normally due to the silane additive 200 (e.g., in the enhanced crack filler 400) offering silane bonds, which are some of the strongest bonds found in nature.

Any of the steps, functions, and operations discussed herein can be performed continuously and automatically.

The exemplary systems and methods of this disclosure have been described in relation to crack filler and crack filling systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s)

or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "aggregate" and variations thereof, as used herein, may refer to coarse particulate material used in construction, to include crushed stone, gravel, sand, silt, slag, recycled concrete, geosynthetic aggregates and clay.

The term "asphalt", "asphalt mix" and "asphalt cement" and variations thereof, as used herein, may refer to a composite material comprising aggregate and a binder used in construction projects to include road surfaces, parking lots and airports.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "binding agent" and variations thereof, as used herein, may refer to any material or substance that holds or draws aggregate together to form a cohesive asphalt, to include bitumen and any "bituminous material."

The term "bulk asphalt" and variations thereof, as used herein, may refer to asphalt provided in large quantities, typically by dump truck.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The term "crack filler" and variations thereof, as used herein, may refer to any commercially-available crack filler, to include commercially-available crack filler materials provided as 50-pound blocks and/or commercially-available asphalt joint sealants, those combining asphalt cement (AC) and latex polymer, and any rubberized crack fillers.

The terms "determine," "calculate," "compute," and variations thereof, as used herein, are used interchangeably and include any type of methodology, process, mathematical operation or technique.

The term "organosilane" and variations thereof, as used herein, may refer to any organic derivative of a silane containing at least one carbon to silicon bond.

The term "repair area" and variations thereof, as used herein, may refer to any atypical or degraded characteristic of a prototypical roadway, to include potholes, ruts, crowns, upheaval, raveling, shoving, stripping, grade depressions, and cracking of various types to include line cracking and alligator cracking.

The term "roadway" and variations thereof, as used herein, may refer to roads, paths, or of all capacity, whether private or public, of various pavement compositions to include concrete, asphalt, asphalt concrete, and reclaimed asphalt pavement.

What is claimed is:

1. A method of repairing a crack in an asphalt surface, comprising:
    adding a predetermined amount of crack filler material to a crack filler preparation receptacle, the crack filler material comprising at least one of asphalt cement, aggregate, polymers, petroleum extracts, polyester fiber, and solvents;
    adding, based on the predetermined amount of crack filler added to the crack filler preparation receptacle, a predetermined amount of silane additive to the crack filler preparation receptacle, the silane additive comprising organosilane and benzyl alcohol;
    mixing the crack filler material and silane additive together in the crack filler preparation receptacle under heat for a period of time forming an enhanced crack filler substance, wherein an amount of the benzyl alcohol in the silane additive forms the enhanced crack filler substance into a liquid;
    dispensing the enhanced crack filler substance into the crack in the asphalt surface; and
    curing the dispensed enhanced crack filler substance.

2. The method of claim 1, wherein the crack filler material includes the aggregate,
    and wherein the aggregate comprises at least one of crushed stone, gravel, sand, silt, slag, recycled concrete, geosynthetic material, and clay.

3. The method of claim 2, wherein an amount of the organosilane comprises 23% to 27% of the silane additive, and wherein the amount of the benzyl alcohol comprises 72% to 74% of the silane additive.

4. The method of claim 3, wherein the silane additive further comprises ethylene glycol, and wherein an amount of the ethylene glycol comprises 1% to 2% of the silane additive.

5. The method of claim 3, wherein a total weight of the silane additive is approximately 0.1 percent of a total weight of the crack filler material added to the crack filler preparation receptacle.

6. The method of claim 4, wherein the crack filler, the silane additive, and/or the enhanced crack filler substance is heated to no more than 360 degrees F. inside the crack filler preparation receptacle.

7. The method of claim 5, wherein a weight of the benzyl alcohol in the silane additive is approximately three times a weight of the organosilane in the silane additive.

8. The method of claim 6, wherein prior to dispensing the enhanced crack filler substance, the method further comprises:
    preparing the crack to receive the enhanced crack filler substance by at least one of vacuuming detritus from the crack, forcing dry air into the crack ejecting detritus therefrom, and sweeping an area around the crack.

9. The method of claim 8, wherein after preparing the crack to receive the enhanced crack filler substance, the method further comprises:
    aligning a dispensing element of the crack filler preparation receptacle adjacent to the prepared crack.

10. The method of claim 9, wherein the crack filler material and silane additive are mixed together for at least 30 minutes to form the enhanced crack filler substance.

11. The method of claim 9, wherein curing the dispensed enhanced crack filler substance comprises:
    cooling the dispensed enhanced crack filler substance for an amount of time until the enhanced crack filler hardens from the liquid form into a solid form.

12. The method of claim 9, further comprising:
contacting a surface of the dispensed enhanced crack filler substance outside of the crack with a contacting surface of an object;
monitoring the surface of the dispensed enhanced crack filler substance as the contacting surface is removed from the surface of the dispensed enhanced crack filler substance;
determining whether any of the enhanced crack filler substance adheres to the contacting surface removed from the surface of the dispensed enhanced crack filler substance; and
curing the dispensed enhanced crack filler substance for an amount of time until the enhanced crack filler hardens from the liquid form into a solid form.

13. The method of claim 9, further comprising:
determining that surface defects are present on the surface of the dispensed enhanced crack filler substance outside of the crack;
determining, based on the surface defects, that the surface defects are unrepairable;
removing the enhanced crack filler substance from the crack; and
dispensing a replacement amount of enhanced crack filler substance into the crack in the asphalt surface; and
curing the dispensed replacement amount of enhanced crack filler substance.

14. An enhanced crack filler substance prepared by a process comprising:
providing a predetermined amount of crack filler material comprising at least one of asphalt cement, aggregate, polymers, petroleum extracts, polyester fiber, and solvents;
heating the predetermined amount of crack filler material to a melting temperature;
mixing a predetermined amount of silane additive comprising organosilane, benzyl alcohol, and ethylene glycol with the heated crack filler material for a period of time, wherein after the period of time, the mixed silane additive and heated crack filler material form an enhanced crack filler substance, and wherein a proportion of the organosilane, benzyl alcohol, and ethylene glycol forms the enhanced crack filler substance into a liquid.

15. The enhanced crack filler substance of claim 14, wherein the crack filler material includes the aggregate, and wherein the aggregate comprises at least one of crushed stone, gravel, sand, silt, slag, recycled concrete, geosynthetic material, and clay.

16. The enhanced crack filler substance of claim 14, wherein an amount of the organosilane comprises 23% to 27% of the silane additive, and wherein an amount of the benzyl alcohol comprises 72% to 74% of the silane additive.

17. The enhanced crack filler substance of claim 16, wherein a total weight of the silane additive is approximately 0.1 percent of a total weight of the crack filler material.

18. An enhanced crack filling system, comprising:
a crack filler receptacle;
a temperature sensor that measures a temperature of contents inside the crack filler receptacle;
at least one heating element that, in response to a temperature measured by the temperature sensor, heats the crack filler receptacle and the contents inside the crack filler receptacle;
an enhanced crack filler substance disposed inside the crack filler receptacle, the enhanced crack filler substance, comprising:
a predetermined amount of heated crack filler comprising at least one of asphalt cement, aggregate, polymers, petroleum extracts, polyester fiber, and solvents; and
a predetermined amount of silane additive mixed with the crack filler under heat for a period of time, wherein the silane additive includes organosilane and a predetermined amount of a solvent comprising benzyl alcohol and ethylene glycol, and wherein the predetermined amount of the solvent in the silane additive forms the enhanced crack filler substance into a liquid; and
a dispensing applicator operatively interconnected with the crack filler receptacle and
configured to convey the enhanced crack filler substance from the crack filler receptacle into a crack in asphalt.

19. The enhanced crack filling system of claim 18, further comprising:
a crack filler substance dispenser that automatically adds the crack filler substance to the crack filler receptacle.

20. The enhanced crack filling system of claim 18, further comprising:
an imaging system that monitors an output of the dispensing applicator and monitors a surface of the dispensed enhanced crack filler substance for defects.

* * * * *